United States Patent
Miyake et al.

(10) Patent No.: US 8,526,139 B2
(45) Date of Patent: Sep. 3, 2013

(54) MAGNETIC HEAD AND MAGNETIC DISK DRIVE INCLUDING AN ELECTROTHERMAL BODY

(75) Inventors: Koji Miyake, Kanagawa (JP); Hidekazu Kohira, Kanagawa-ken (JP); Kiyoshi Hashimoto, Kanagawa (JP); Takanori Yamazaki, Kanagawa-ken (JP); Hideaki Tanaka, Kanagawa (JP)

(73) Assignee: HGST Netherlands B.V., Amsterdam (NL)

( * ) Notice: Subject to any disclaimer, the term of this patent is extended or adjusted under 35 U.S.C. 154(b) by 917 days.

(21) Appl. No.: 11/880,258

(22) Filed: Jul. 19, 2007

(65) Prior Publication Data

US 2008/0024915 A1   Jan. 31, 2008

(30) Foreign Application Priority Data

Jul. 19, 2006   (JP) .................................. 2006-197425

(51) Int. Cl.
*G11B 5/127* (2006.01)

(52) U.S. Cl.
USPC ................................ 360/125.31; 360/125.74

(58) Field of Classification Search
USPC ........................................ 360/125.31, 125.74
See application file for complete search history.

(56) References Cited

U.S. PATENT DOCUMENTS

| 7,372,665 | B1* | 5/2008 | Stoev et al. | 360/125.33 |
|---|---|---|---|---|
| 7,403,354 | B2* | 7/2008 | Pust et al. | 360/125.31 |
| 7,542,246 | B1* | 6/2009 | Song et al. | 360/319 |
| 7,612,965 | B2* | 11/2009 | Kurihara et al. | 360/125.75 |
| 7,656,619 | B1* | 2/2010 | Yan et al. | 360/294.7 |
| 2003/0021065 | A1* | 1/2003 | Yamada et al. | 360/126 |
| 2003/0174430 | A1* | 9/2003 | Takahashi et al. | 360/75 |
| 2004/0240109 | A1* | 12/2004 | Hamann et al. | 360/126 |
| 2005/0024775 | A1* | 2/2005 | Kurita et al. | 360/234.3 |
| 2005/0190479 | A1* | 9/2005 | Terris et al. | 360/59 |
| 2006/0077591 | A1* | 4/2006 | Kurihara et al. | 360/128 |
| 2007/0035881 | A1* | 2/2007 | Burbank et al. | 360/234.3 |
| 2007/0230010 | A1* | 10/2007 | Jin et al. | 360/69 |
| 2007/0268622 | A1* | 11/2007 | Martin | 360/122 |
| 2007/0268624 | A1* | 11/2007 | Luo et al. | 360/126 |
| 2008/0019041 | A1* | 1/2008 | Aoki | 360/110 |

FOREIGN PATENT DOCUMENTS

JP   05-020635   1/1993

* cited by examiner

*Primary Examiner* — Wayne Young
*Assistant Examiner* — Adam B Dravininkas

(57) ABSTRACT

A magnetic head and a magnetic disk drive using the same is disclosed. The head is capable of increasing efficiency in changing the flying height of an element portion by heat generation of a heater in the magnetic head using the heater as well as capable of suppressing the change of the flying height of the element portion at the time of recording.

5 Claims, 17 Drawing Sheets

Fig. 1
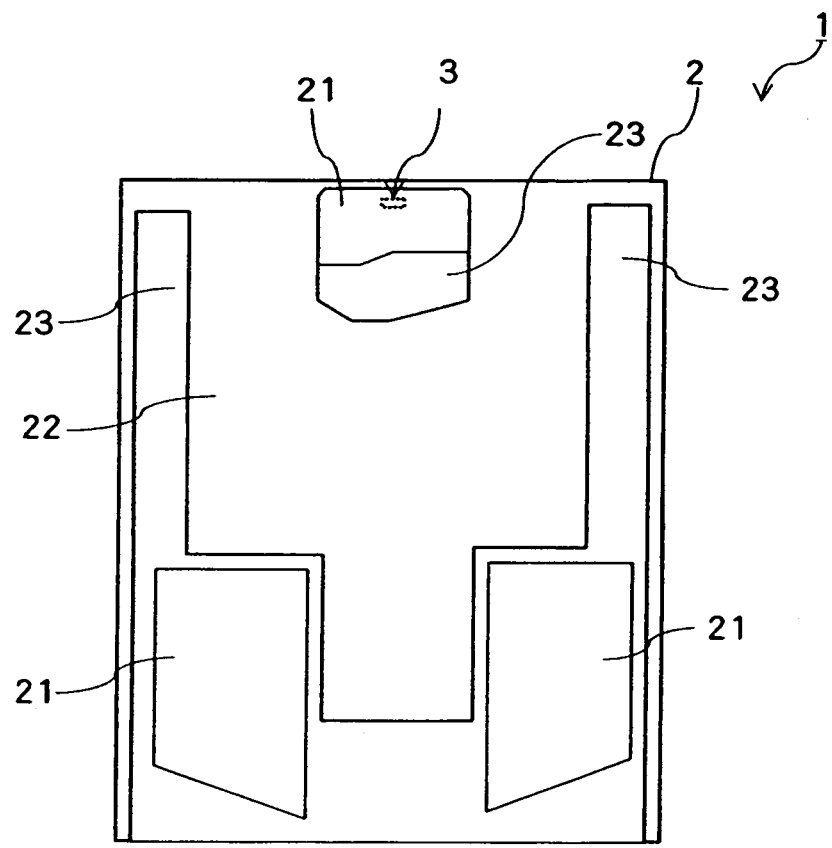
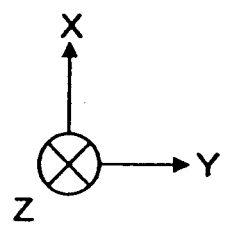

B-B

C-C

MAGNETIC HEAD AND MAGNETIC DISK DRIVE INCLUDING AN ELECTROTHERMAL BODY

CROSS-REFERENCE TO RELATED APPLICATION

The instant nonprovisional patent application claims priority to Japanese Patent Application No. 2006-197425 filed Jul. 19, 2006 and incorporated by reference in its entirety herein for all purposes.

BACKGROUND OF THE INVENTION

A magnetic disk drive such as a hard disk drive (HDD) includes a magnetic head in which an element portion including a reproducing element and a recording element is attached to a slider, and perform reproducing/recording of data in a state that the magnetic head flies over a magnetic disk. In such magnetic disk drive, it is required to reduce the height (hereinafter, referred to as flying height of the element portion) of element portion of the magnetic head in flying state from the magnetic disk for realizing further high recording density.

In Japanese Patent Publication No. 5-20635 ("Patent Document 1"), a magnetic head is proposed, in which a heater is provided in the vicinity of the reproducing element and the recording element, and the periphery of the element portion is displaced from an air-bearing surface which is a surface facing the magnetic disk to the side of the magnetic disk utilizing heat expansion due to heat generation by the heater, thereby adjusting the flying height of the element portion.

In the magnetic head using the above heater, since the heater is formed in the vicinity of the reproducing element and the recording element, the temperature of elements tends to increase and it is difficult to expect good element life. Accordingly, it is required for the magnetic head to vary the flying height of the element portion efficiently with respect to electric power given to the heater so that electric power to be given to the heater will be lower.

A coil is used in the recording element included in the magnetic head, and the coil generates heat by iron loss or copper loss at the time of recording data, therefore, the periphery of the element portion is raised from the air-bearing surface also by the heat expansion caused by the heat generation in the same manner as the case of the heater. However, it is required for the raise occurring at the time of recording not to vary the flying height of the element portion so much.

BRIEF SUMMARY OF THE INVENTION

Embodiments in accordance with the present invention provide a magnetic head and a magnetic disk drive using the same, which is capable of increasing efficiency in changing the flying height of an element portion by heat generation of a heater in the magnetic head using the heater as well as capable of suppressing the change of the flying height of the element portion at the time of recording. According to the particular embodiment disclosed in FIG. 11, in a magnetic head 1 of the invention, when a portion is defined as a "heater immobility line 51", in which a position of the positive pressure generation surface 21 does not vary when the electricity is distributed to a heater, and a portion is defined as a "write immobility line 52", in which a position of the positive pressure generation surface 21 does not vary at the time of recording, the area of the raised region surrounded by the heater immobility line 51 is smaller than the area of the raised region surrounded by the write immobility line 52.

BRIEF DESCRIPTION OF THE DRAWINGS

FIG. 1 is a view showing an air-bearing surface (surface facing a magnetic disk) of a magnetic head.

DETAILED DESCRIPTION OF THE INVENTION

Figure 2:
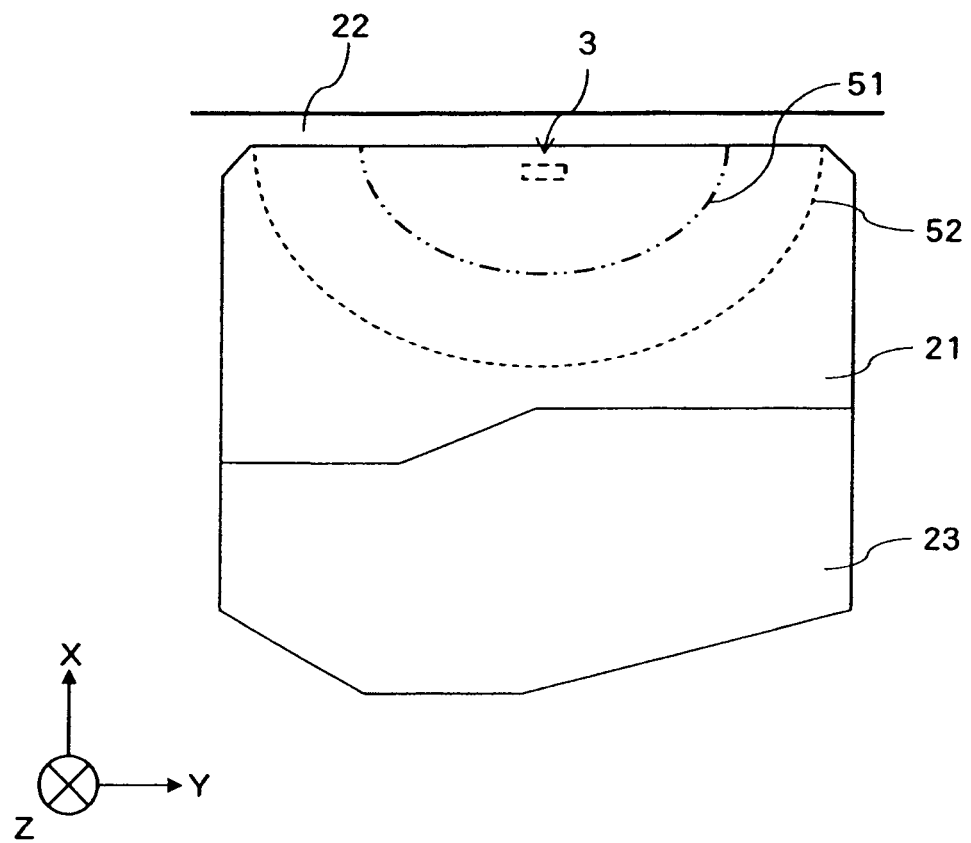
FIG. 2 is a relevant part enlarged view of FIG. 1.

Embodiments in accordance with the present invention relate to a magnetic head and a magnetic disk drive using the same, which is capable of adjusting the distance to a surface of a magnetic disk.

Embodiments of the invention have been made in view of the above, and an object thereof is to provide a magnetic head and a magnetic disk drive using the same, which is capable of increasing efficiency in changing the flying height of the element portion caused by the heat generation of the heater in the magnetic head using the heater, and suppressing the change of the flying height of the element portion at the time of recording data.

In order to solve the above problems, a magnetic head according to embodiments of the invention is characterized by including a magnetic recording element and an electrothermal body which generates heat by turning on electricity, in which, when a region in which an air-bearing surface which is a surface facing a magnetic disk is displaced to the side of the magnetic disk due to heat deformation by heat generation of the magnetic recording element at the time of recording is a first region, and when a region in which the air-bearing surface is displaced to the side of the magnetic disk due to heat deformation by heat generation of the electrothermal body at the time of turning on electricity is a second region, the area of the second region is smaller than the area of the first region.

The magnetic head according to embodiments of the invention is characterized in that the second region is included in the first region.

Next, a magnetic head according to embodiments of the invention is characterized by including a magnetic recording element and an electrothermal body which generates heat by turning on electricity, in which the magnetic recording element includes a coil wound along an air-bearing surface which is a surface facing a magnetic disk, and in which the area of a projected region of the coil with respect to the air-bearing surface is larger than the area of a projected region of the electrothermal body with respect to the air-bearing surface.

Next, a magnetic head according to embodiments of the invention is characterized by including a magnetic recording element and an electrothermal body which generates heat by turning on electricity, in which the magnetic recording element includes a coil wound extending in an in-plane direction of an air-bearing surface which is a surface facing a magnetic disk, and in which the area of a projected region of the coil with respect to the air-bearing surface is larger than the area of a projected region of the electrothermal body with respect to the air-bearing surface.

Next, a magnetic disk drive according to embodiments of the invention is characterized by including the magnetic head.

According to embodiments of the invention, change of the flying height of the element portion by heat generation of the heater is allowed to be efficient as well as the change of the flying height of the element portion at the time of data recording is allowed to be suppressed.

Embodiments of the magnetic head and the magnetic disk drive in accordance with the present invention will be explained with reference to the drawings. When there are overlapping components in respective embodiments, same numerals are put to omit the detailed explanation.

A first embodiment of a magnetic head will be explained. FIG. 1 is a view showing an air-bearing surface (surface facing the magnetic disk) of a magnetic disk 1 according to the first embodiment. FIG. 2 is a relevant part enlarged view of FIG. 1. A positive side of X-direction is a rotation direction of the magnetic disk, namely, a direction in which airflow flows with respect to the magnetic head 1. Z direction is a vertical direction with respect to the magnetic disk, and a positive side thereof is a flying direction of the magnetic head 1.

The magnetic head 1 has a structure in which a thin-film element portion 3 performing reproducing/recording of data with respect to a magnetic disk is attached to a slider 2 having a rectangular parallelepiped shape. The slider 2 includes a positive pressure generation surface 21, a negative pressure generation surface 22 and an intermediate surface 23 at the surface (air-bearing surface) facing the magnetic disk, and having a shape for flying the magnetic head 1 over the rotating magnetic disk. Here, the positive pressure means a pressure in the flying direction (z+ direction) of the magnetic head 1, and the negative pressure means a pressure in the inverse direction thereof (z− direction). The positive pressure generation surface 21 has a shape extending in the z− direction, which is a surface generating the positive pressure by receiving airflow. The negative pressure generation surface 22 has a shape entering into the z+ direction, which is a surface generating the negative pressure by receiving airflow. The intermediate surface 23 has the height which is intermediate between the positive pressure generation surface 21 and the negative pressure generation surface 22.

The magnetic head 1 is inclined so that the X+ side of the air-bearing surface comes close to the magnetic disk. The element portion 3 is provided at a position in the positive pressure generation surface 21 formed in the vicinity of the center of an end of the X+ side in the air-bearing surface, at the position close to the end of the X+ side, which is positioned at a portion proximate to the magnetic disk at the time of flying (refer to a view of solid lines in FIG. 8).

Figure 3:
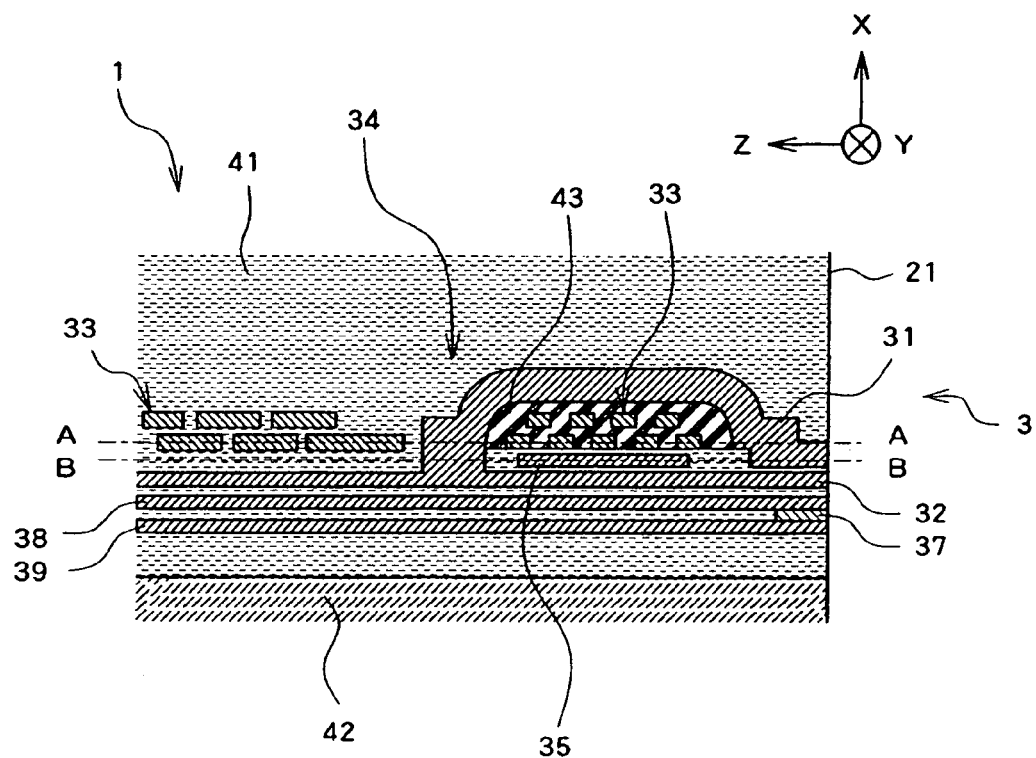
FIG. 3 is a view showing a cross-sectional structure of XZ plane of an element portion.
Figure 4:
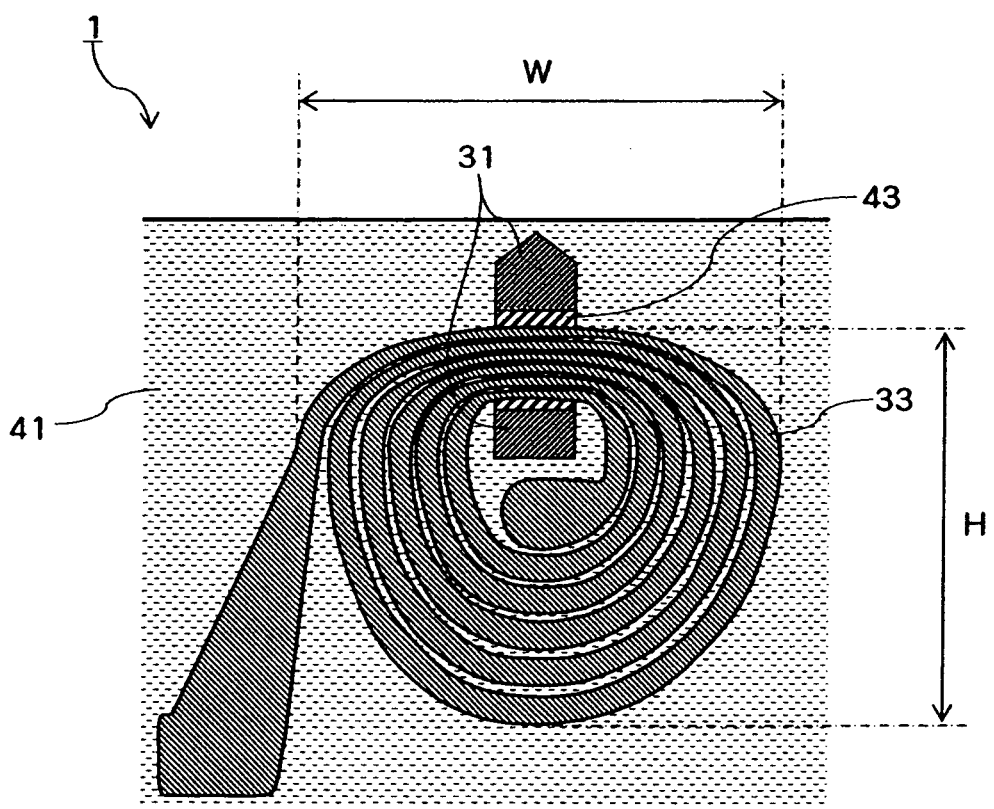
FIG. 4 is a view showing a cross-sectional structure of YZ plane of the element portion.
Figure 5:
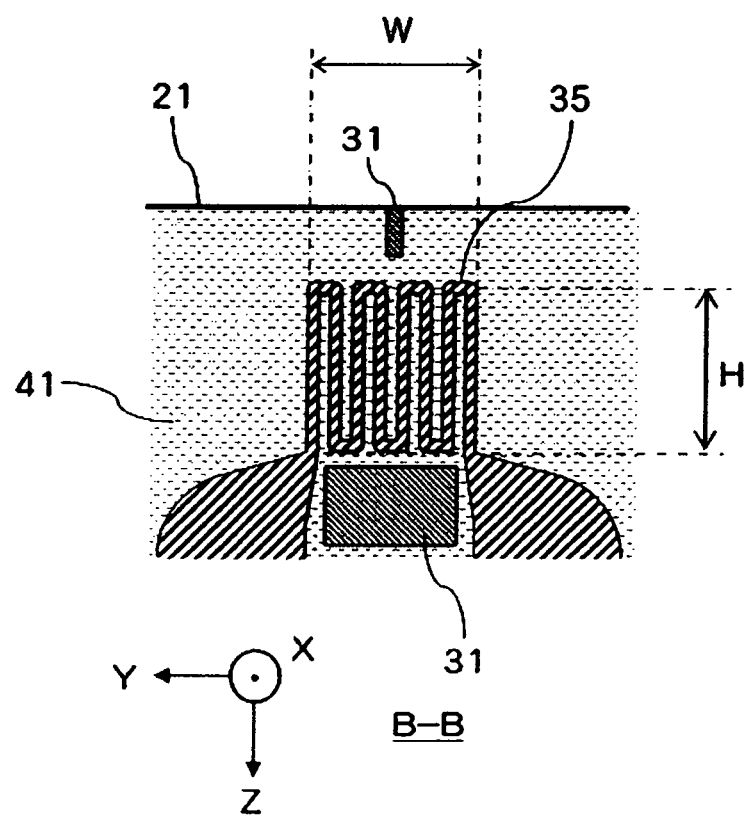
FIG. 5 is a view showing a cross-sectional structure of YZ plane of the element portion.

FIG. 3 is a view showing a cross section structure of XZ plane of the element portion 3. FIG. 4 is a cross-sectional view taken along an A-A line in FIG. 3. FIG. 5 is a cross-sectional view taken along a B-B line in FIG. 3. The element portion 3 is formed as a thin-film element including a layer structure as shown in FIG. 3. Here, an upper side indicates a layering direction in the layer structure, namely, the X+ direction. In the element portion 3, a reproducing element 37 is arranged between two layers of magnetic shields 38, 39 on a substrate 42. The reproducing element 37 includes elements such as GMR elements which reproduces data recorded in the magnetic disk, arranged to be exposed at the air-bearing surface. A recording element 34 is provided over the magnetic barrier layer 38. The recording element 34 is an element for recording data in a recording surface of the magnetic disk, and the detailed structure thereof will be described later. Gaps between these members are filled with an intermediate layer 41 made of ceramics such as alumina.

The recording element 34 includes a first magnetic pole (positive pole) 31, a second pole (negative pole) 32, a coil 33 and a heater (electrothermal body) 35. The first magnetic pole 31 has an arch shape, one end side of which is attached to a plate-shaped second magnetic pole 32 and a tip of the other end side is exposed at the positive pressure generation surface 21 in a state in which a slight gap is kept with respect to the second magnetic pole 32. The other end side is tapered with respect to the positive pressure generation surface 21 to concentrate the magnetic field to be generated as shown in FIG. 4 and FIG. 5.

The coil 33 is wound in a planar volute shape so as to surround the end side of the first magnetic pole 31 attached to the second magnetic pole 32, arranged along a layer surface (ZY plane) in the layer structure, which generates recording magnetic field between the first magnetic pole 31 and the second magnetic pole 32 by receiving electric signals indicating data to be recorded from outside. In addition, a portion of the coil 33 covered by the first magnetic pole 31 is fixed to the first magnetic pole 31 by a resin material 43. Here, in a circular outline of the coil 33, the maximum length of the outline along the Y direction is the width W of the coil 33, and the maximum length of the outline along the Z direction is the height H of the coil 33, and the area inside the outline is the area of the coil 33.

The heater 35 is provided between the first magnetic pole 31 and the second magnetic pole 32 of the recording element 34, generating heat when turning on electricity. By allowing the periphery to be heat expanded, the periphery of the element portion 3 is displaced from the positive pressure generation surface 21 to the direction of the magnetic disk (Z− direction) to reduce the flying height of the element portion (refer to the view of a chain double-dashed line 5 in FIG. 8). The heater 35 has a rectangular outline including a resistance line which is folded alternately in opposite directions like a bellow as shown in FIG. 5. Here, in the rectangular outline of the heater 35, the maximum length of the outline along the Y direction is the width W of the heater 35, and the maximum length of the outline along the Z direction is the height H of the heater 35, and the area inside the outline is the area of the heater 35. In the case that the heater is formed over a plurality of layers in the thickness direction (X direction), for example, when the interlayer is 2 μm or less, it can be regarded as one heater.

As compared with the size between the coil 33 and the heater 35, the height H of the coil 33 can be approximately no less than twice the height H of the heater 35. The width W of the coil 33 can be approximately no less than twice the width W of the heater 35. The area of the coil 33 can be approximately no less than 3.5 times the area of the heater 35.

Figure 6:
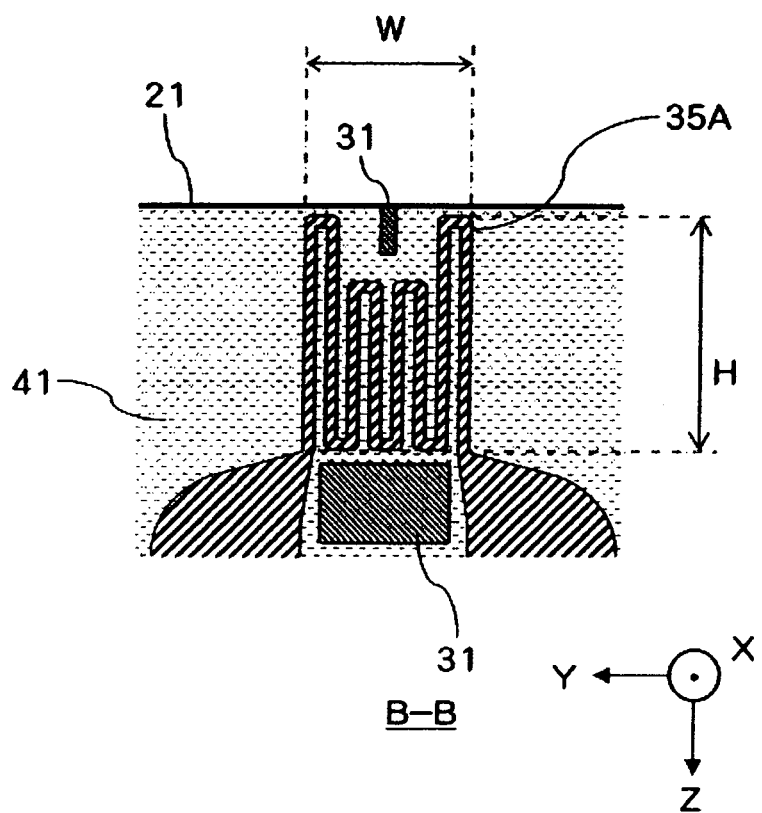
FIG. 6 is a first modification example of FIG. 5.
Figure 7:
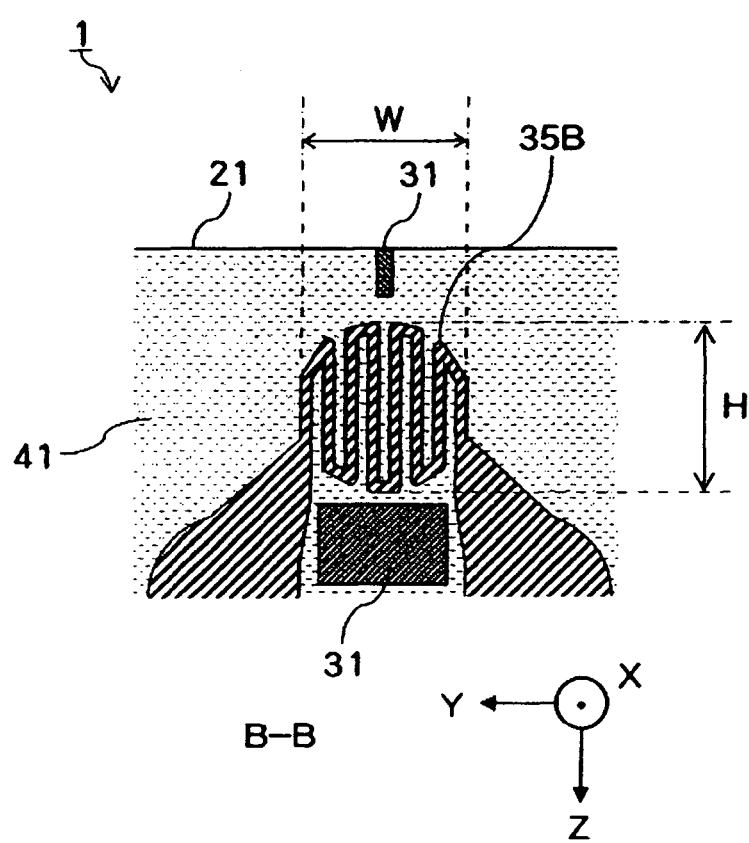
FIG. 7 is a second modification example of FIG. 5.

Modification examples of the heater 35 in FIG. 5 are shown in FIG. 6 and FIG. 7. A heater 35A of a first modification example shown in FIG. 6 has a concave outline including a resistance line which is folded alternately in opposite directions like a bellow. Specifically, concerning the outline of the convex shape of the heater 35A, parts of both sides of the Y+ side and the Y− side respectively extend to the positive pressure generation surface 21, and the extending portions surround the end of the first magnetic pole 31 at the side of the positive pressure generation surface 21. A heater 35B of a second modification example shown in FIG. 7 has a circular outline including the resistance line which is folded alternately in opposite directions like a bellow. The width, height, and area of these heaters can be defined in the same manner as the above.

Figure 8:
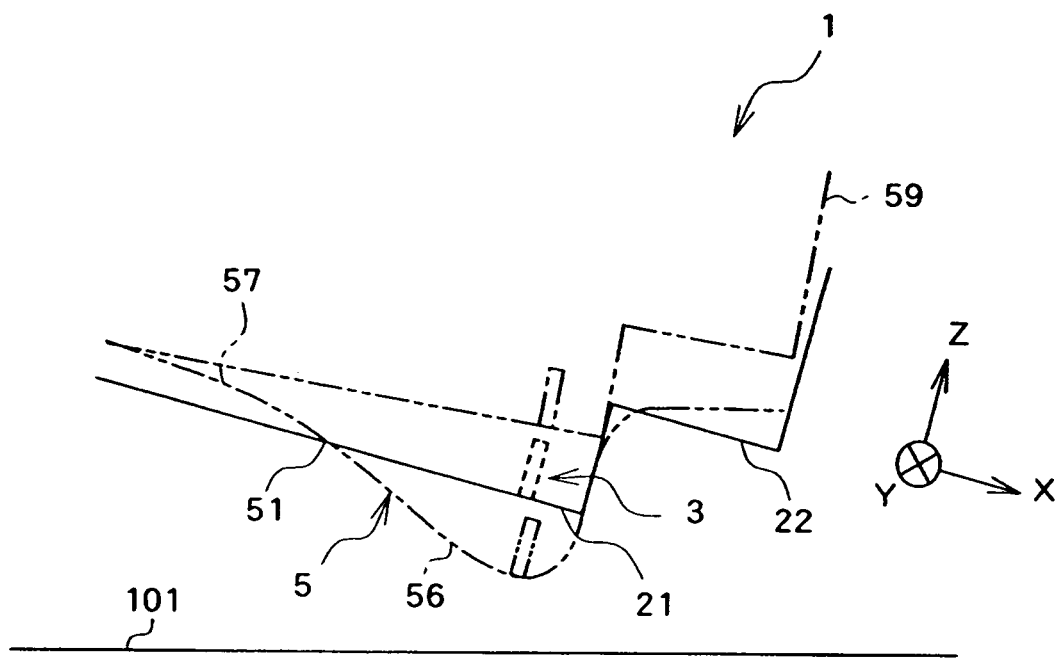
FIG. 8 is an explanatory view showing a state in which a magnetic head flies.

The transition of the air-bearing surface in the magnetic head 1 including the above structure will be explained. FIG. 8 is an explanatory view showing a state in which the magnetic head 1 flies. In FIG. 8, a view drawn in a solid line indicates an outline of the magnetic head 1 when the electricity is not distributed to the heater 35. A view drawn in the chain double-dashed line 5 indicates an outline of the magnetic head 1 when the electricity is distributed to the heater 35. A view drawn in a chain double-dashed line 59 indicates an outline of the magnetic head 1 when the flying amount of the magnetic head 1 varies (in the drawing, the raised shape is not reflected for explanation). According to the drawing, a raised portion 56 (lowering portion of flying) and a sinking portion 57 (rising portion of flying) appear at the positive pressure generation surface 21 formed in the vicinity of the center of the end of the X+ side in the air-bearing surface. Since the raised portion 56 and the sinking portion 57 appear, generated positive pressure increases in the raised portion 56, and generated positive pressure decreases in the sinking portion 57, therefore, balance relation of the moment acting on the magnetic head 1 varies, and the flying amount of the whole magnetic head 1 varies. Specifically, the flying posture varies so that the end of the side (X+ side) from which airflow flows is lifted. Since the raised portion 56 is raised at the periphery of the element portion 3 as the center, the periphery of the element portion 3 comes close to the magnetic disk 101, thereby reducing the flying height of the element portion.

Here, in the raised portion 56 and the sinking portion 57, a position of the positive pressure generation surface 21 when the electricity is not distributed to the heater 35 is taken as a standard, and a portion in which the surface is displaced to the Z− side from the standard is regarded as the raised portion 57 and a portion in which the surface is displaced to the Z+ side from the standard is regarded as the sinking portion 57. A boundary portion between the raised portion 56 and the sinking portion 57, that is, the portion in which the position of the positive pressure generation surface 21 does not vary when the electricity is distributed to the heater 35 is conceived as a "heater immobility line 51". The heater immobility line 51 is positioned so as to surround the periphery of the element portion 3 as shown later-described FIG. 9 and FIG. 10, and a region (second region) surrounded by the heater immobility line 51 like this is the raised portion 56.

Figure 9:
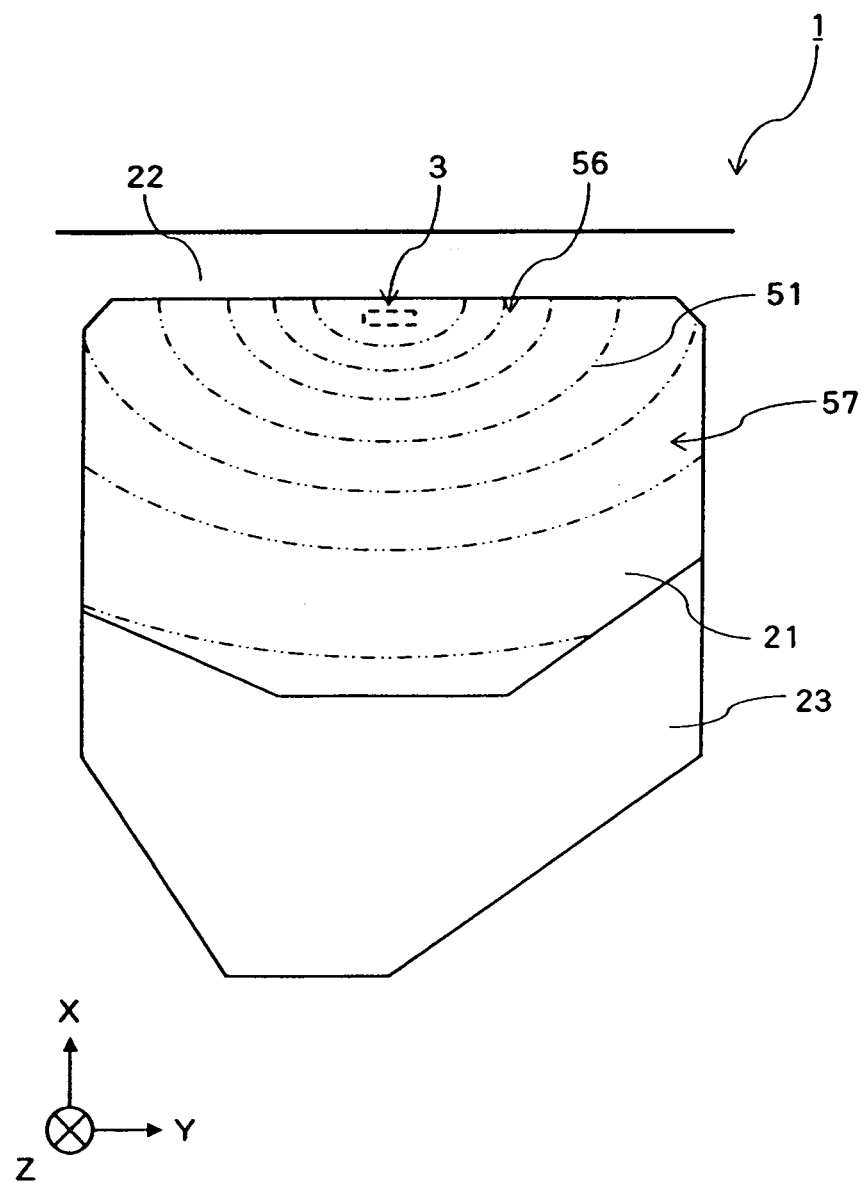
FIG. 9 is view in which contour lines are drawn with respect to the air-bearing surface when electricity is distributed to a heater.

FIG. 9 is a view in which contour lines (contour lines for flying variation) are drawn with respect to the positive pressure generation surface 21 when electricity is distributed to the heater 35. According to the drawing, the positive pressure generation surface 21 is gradually elevated toward the periphery of the element portion 3. In the positive pressure generation surface 21, inclination gradually increases when approaching the periphery of the element portion 3. That is to say, a sharp raise is generated at the raised portion 56 which is inside the heater immobility line 51, and a moderate raise is generated at the sinking portion 57 which is outside the heater immobility line 51.

Figure 10:
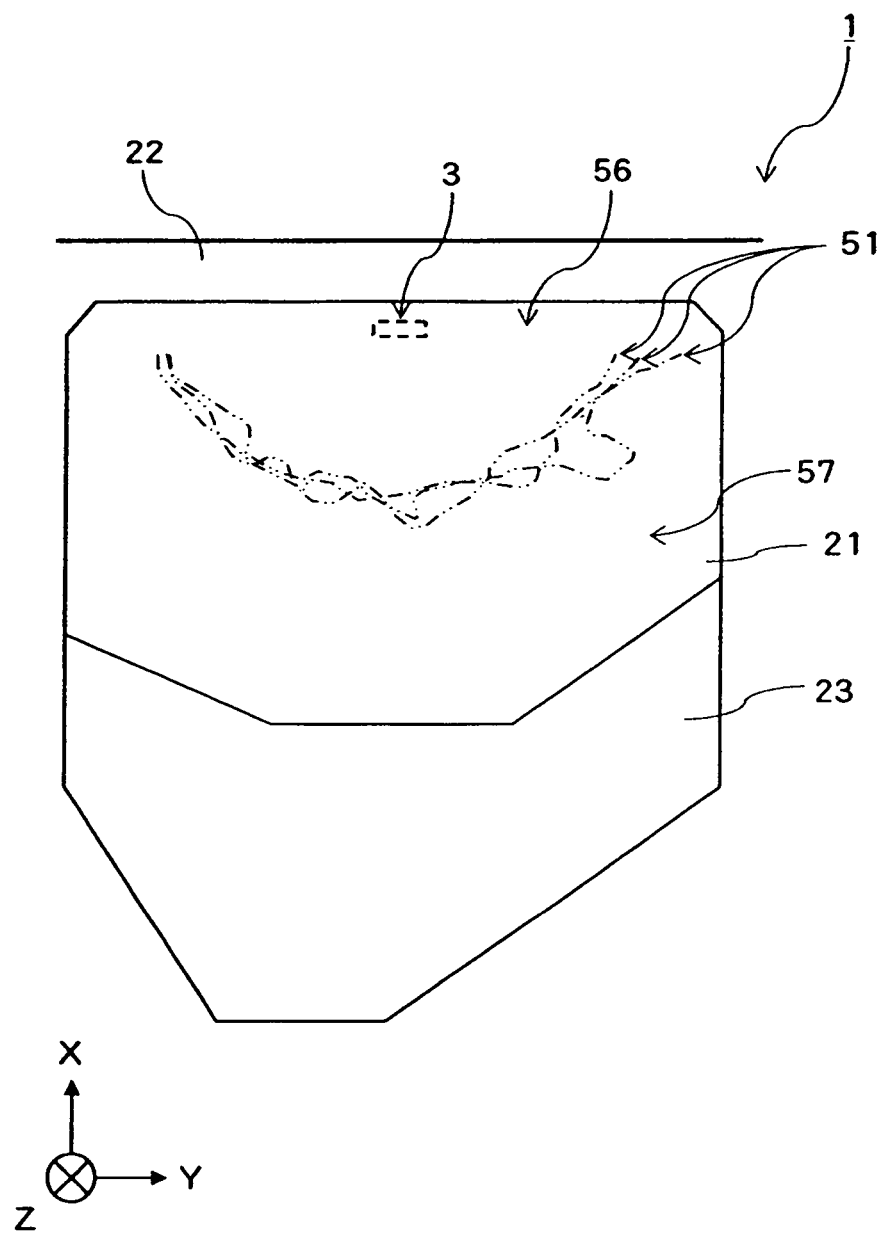
FIG. 10 is a view showing heater immobility lines when the magnitude of electric power applied to the heater is changed.

FIG. 10 is a view in which the heater immobility lines 51 are traced when the magnitude of electric power applied to the heater 35 is changed. The magnitude of electric power applied to the heater 35 is changed to 1.33 times, 1.67 time and the like, taking a certain electric power as a standard. According to the drawing, the position of the heater immobility line 51 does not depend on the magnitude of electric current applied to the heater 35, but it is almost constant. Also according to the drawing, it is considered that the position of the heater immobility line 51 (same meaning as the area of the raised portion 56) is fixed according to characteristics (size and the like) peculiar to the heater. Moreover, it is considered that the magnitude of the electric power applied to the heater 35 exerts an influence not on the area of the raised portion 56, but on the raised height.

The raised portion 56 surrounded by the heater immobility line 51 approaches the magnetic disk 101 as shown in FIG. 8, therefore, it receives sharper airflow, as a result, generated positive pressure further increases. On the other hand, since the sinking portion 57 outside the heater immobility line 51 is apart from the magnetic disk 101, generated positive pressure further reduces. According to the variation of the positive pressure, the flying amount of the magnetic head 1 is determined. That is to say, the flying amount of the magnetic head 1 is affected by the areas of the raised portion 56 and the singing portion 57. When the flying amount of the magnetic head 1 is suppressed, as a result, the flying height of the element portion can be efficiently decreased.

The transition occurs in the air-bearing surface of the magnetic head 1 also at the time of recording data, in addition to the transition by the above heater 35. The recording element 34 of the magnetic head 1 includes the coil 33, and the coil 33 generates heat at the time of recording, which causes the transition at the air-bearing surface of the magnetic head 1. Also concerning the transition occurring at the time of recording, a "write immobility line 52" can be conceived in the same manner as the above heater immobility line 51 (refer to FIG. 2). The write immobility line 52 is positioned so as to surround the periphery of the element portion 3, and a region (a first region) surrounded by the write immobility line 52 is a raised portion generated at the time of recording. The write immobility line 52 is defined by the raised portion generated at the time of recording in a state in which the electricity is not distributed to the heater 35.

Figure 11:
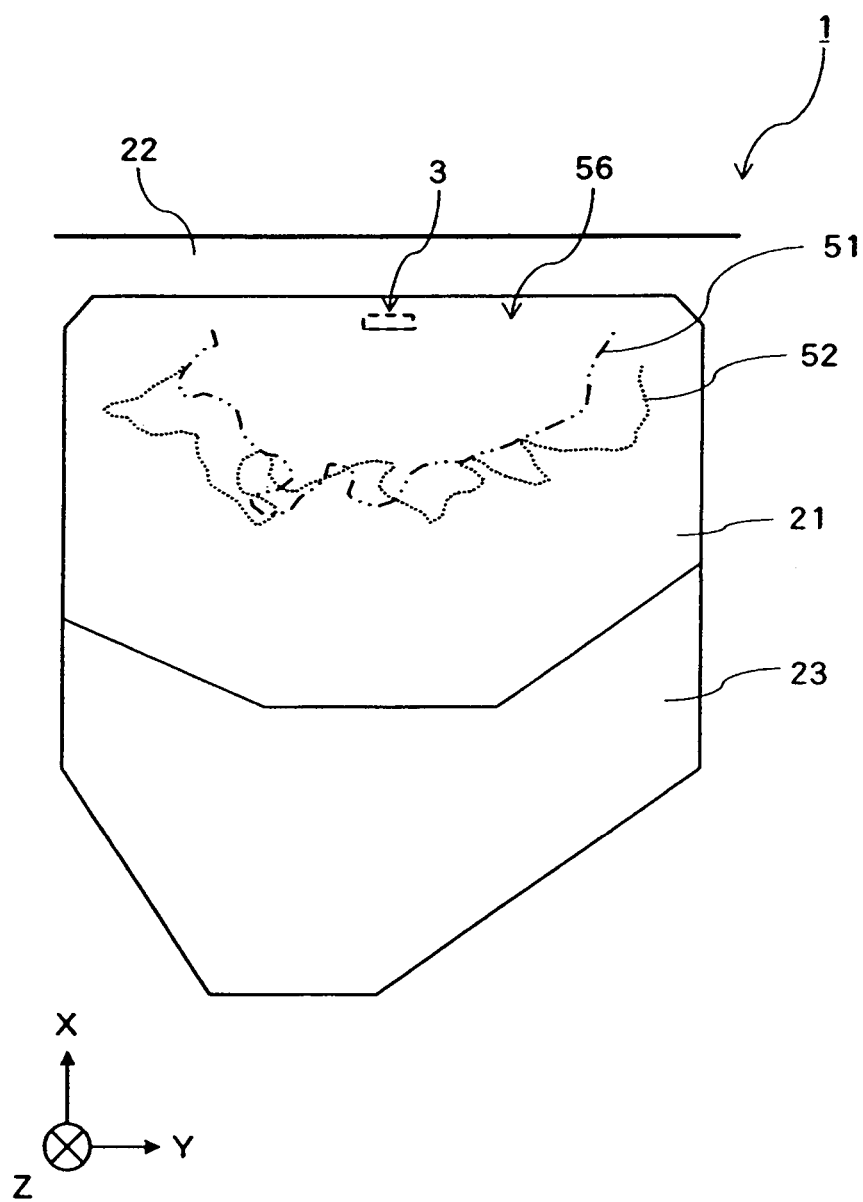
FIG. 11 is a view showing a heater immobility line and a write immobility line.

The relationship between the heater immobility line 51 and the write immobility line 52 conceived as the above will be explained. FIG. 11 is a view in which the heater immobility line 51 and the write immobility line 52 are traced. According to the drawing, the area of the raised portion surrounded by the heater immobility line 51 is smaller than the raised region surrounded by the write immobility line 52.

When the area of the raised region surrounded by the heater immobility line 51 is made smaller as described above, a portion in which large positive pressure is given is made smaller. Therefore, when the periphery of the element portion 3 is raised from the air-bearing surface by the heater 35, the flying of the magnetic head 1 can be suppressed, as a result, the flying height of the element portion can be efficiently decreased.

On the other hand, when the area of the raised region surrounded by the write immobility line 52 is made larger, the portion in which large positive pressure is given is made larger. Therefore, when the element portion 3 is raised from the air-bearing surface at the time of recording, the flying of the magnetic head 1 can be promoted, as a result, it can be prevented that the flying height of the element portion varies a lot at the time of recording.

Figure 12:
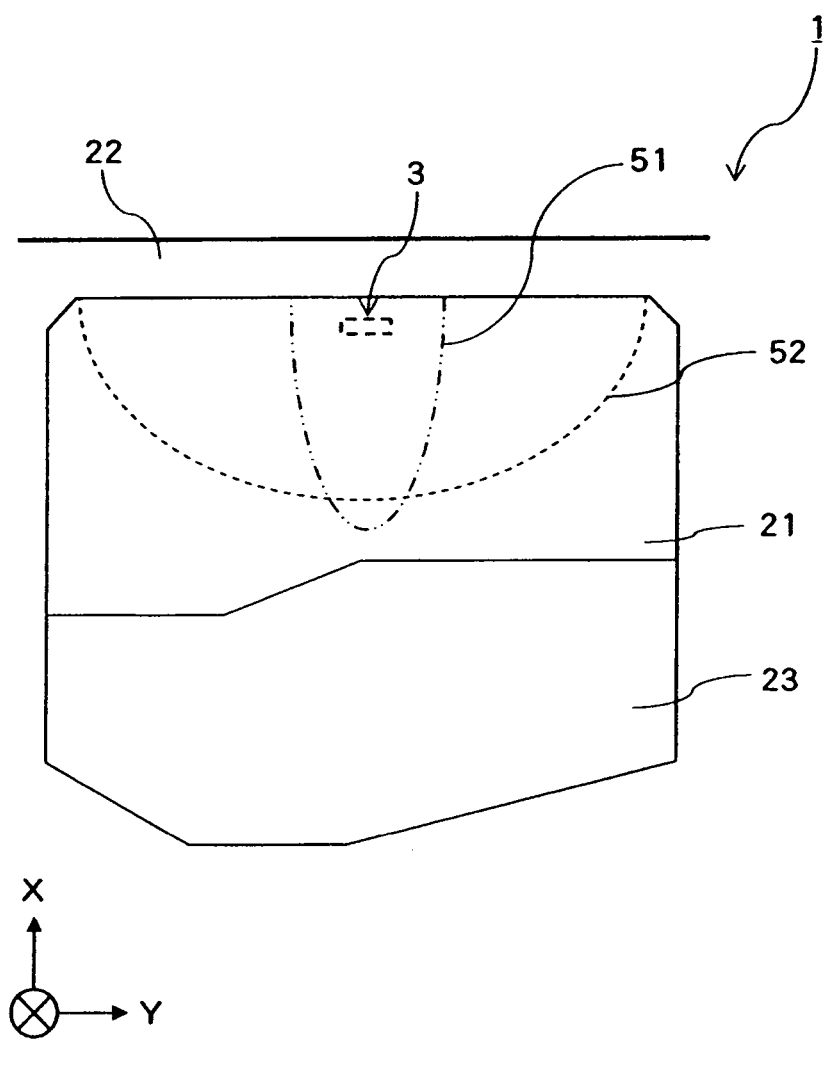
FIG. 12 is a view showing another example of the heater immobility line and the write immobility line.

In FIG. 11, a part of the heater immobility line 51 protrudes outside from the write immobility line 52 (the side not including the element portion 3), however, it is preferable that the raised region surrounded by the heater immobility line 51 is included in the raised region surrounded by the write immobility line 52 in order to obtain the above effect (refer to FIG. 2). When the area of the raised region surrounded by the heater immobility line 51 is sufficiently decreased (for example, approximately not more than one third with respect to the raised region surrounded by the write immobility line 52), the above effect can be obtained sufficiently even if a part of the heater immobility line 51 protrudes outside from the write immobility line 52 as shown in FIG. 12.

The relationship between the heater immobility line 51 and the write immobility line 52 can be realized by satisfying the relationship in size between the heater 35 and the coil 33 as described above. In other words, positions where the heater immobility line 51 and the write immobility line 52 appear are respectively fixed by the size of the coil 33 or the heater 35 and the like, and when the size becomes smaller, the area of the region surrounded by the immobility line is made smaller, and when the size becomes larger, the area of the region surrounded by the immobility line is made larger, therefore, the relationship between the heater immobility line 51 and the write immobility line 52 described above can be realized by adjusting the size of the both.

Figure 13:
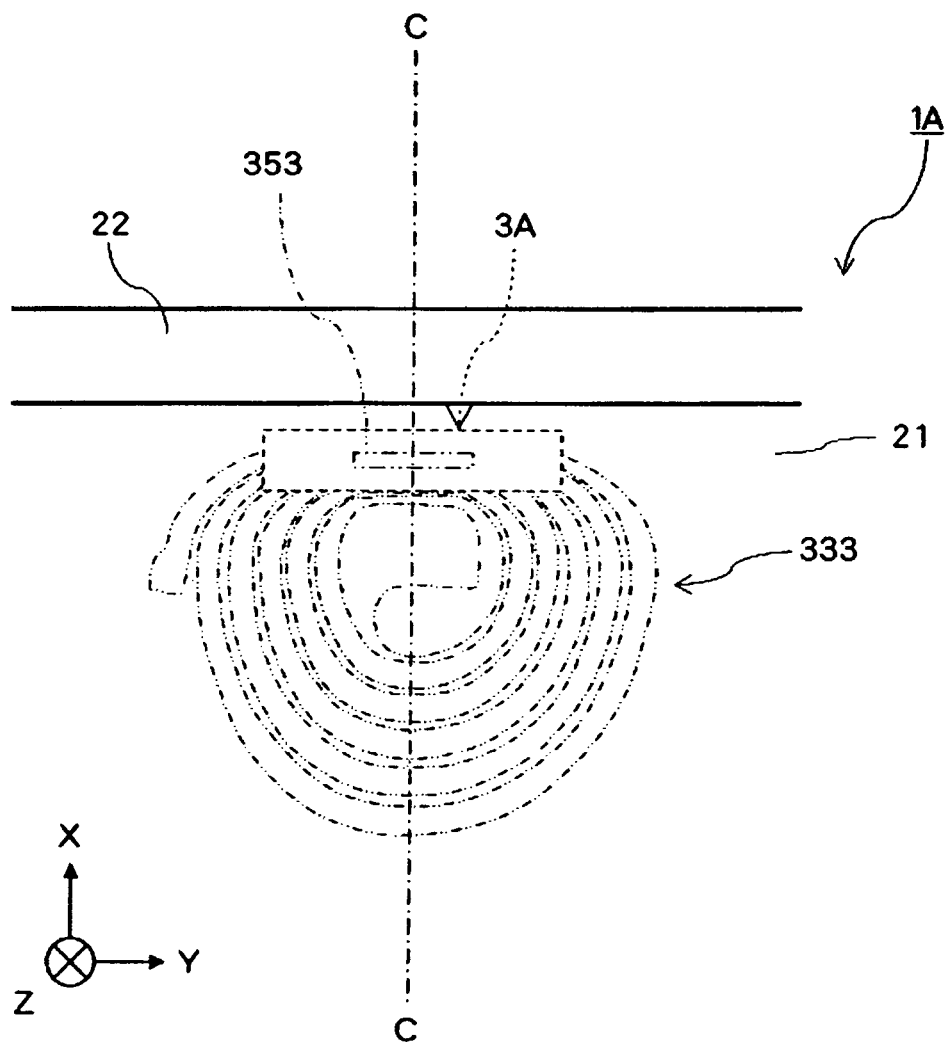
FIG. 13 is a view showing an air-bearing surface of a second embodiment of a magnetic head.
Figure 14:
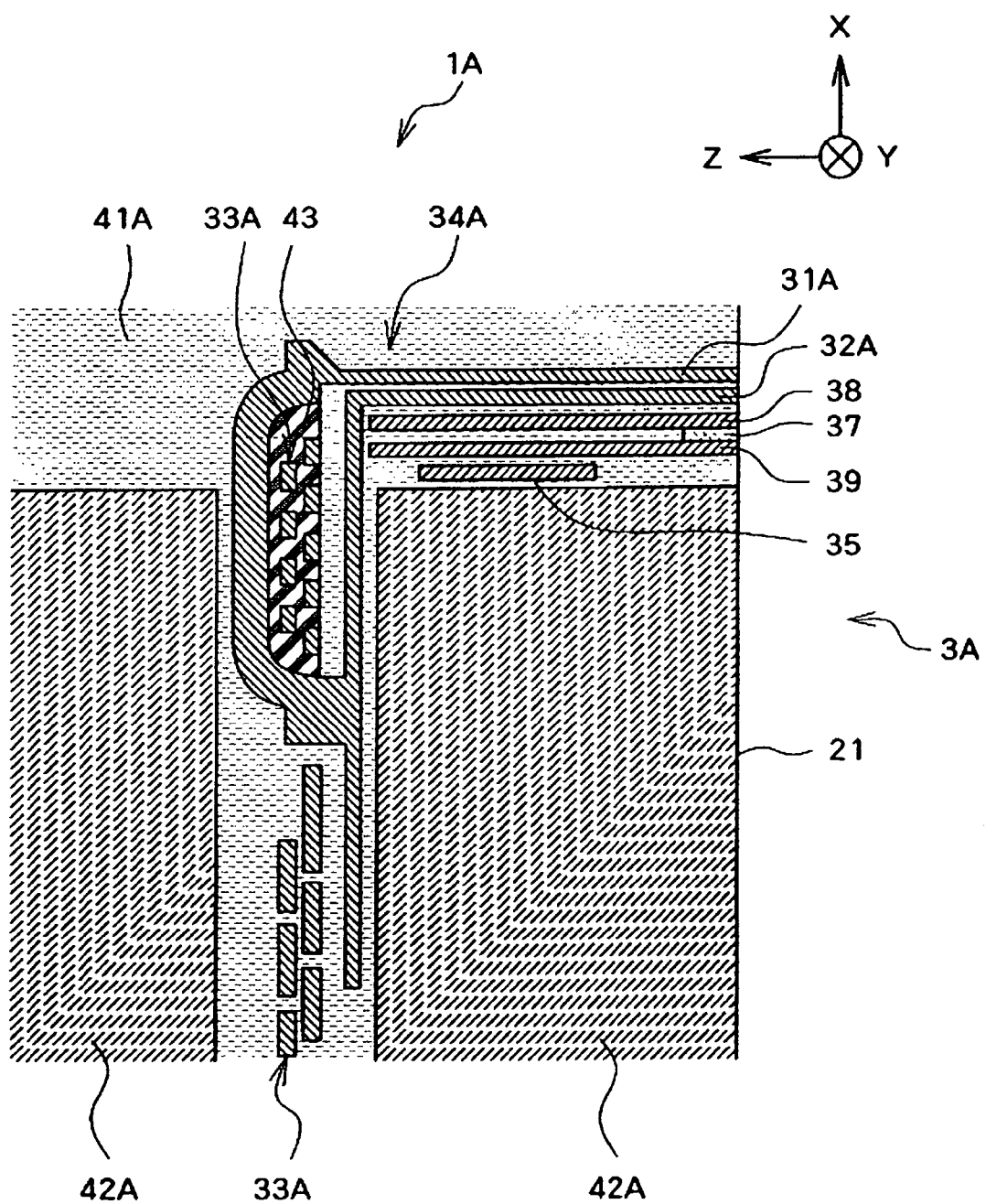
FIG. 14 is a view showing a cross-sectional structure of the second embodiment of the magnetic head.

A second embodiment of a magnetic head will be explained. FIG. 13 is a view showing an air-bearing surface of a magnetic head 1A according to the second embodiment. FIG. 14 is a cross-sectional view taken along a C-C line in FIG. 13.

In the magnetic head 1A, an element portion 3A has a layer structure shown in FIG. 14. A recording element 34A included in the element portion 3A has a shape in which both a first magnetic pole (positive pole) 31A and a second magnetic pole (negative pole) 32A are folded. These poles are arranged in a state in which the side of a shape along the Z direction keeps a slight gap therebetween, and ends thereof expose at the positive pressure generation surface 21. On the other hand, at the side of being folded along the X direction, the first magnetic pole 31A has an arch shape and an end thereof is attached to the second magnetic pole 32. A coil 33A is wound in the planer volute shape so as to surround the end of the first magnetic pole 31A attached to the second magnetic pole 32A, arranged along the positive pressure generation surface 21 (XY plane) as the air-bearing surface. In addition, the heater 35 is arranged between a substrate 42A and the magnetic shield 39. A void is provided in the substrate 42A in the layer-thickness direction, and the portion in which the first magnetic pole 31A and the second magnetic pole 32A fold along the X direction and the coil 33 are formed therein. An intermediate layer 41A is formed so as to fill gaps in the void of the substrate 42A.

In FIG. 13, a view drawn in chain double-dashed lines indicates a region in which the coil 33A is projected on the positive pressure generation surface 21 (projected coil region 333) and a region in which the heater 35 is projected on the positive pressure generation surface 21 (projected heater region 353). When the coil 33A is arranged along the positive pressure generation surface 21 as the air-bearing surface, and when the area of the projected coil region 333 becomes smaller than the projected heater region 353, heat expansion caused by heat generated from the coil 33A at the time of recording will occur over the wide range of the positive pressure generation surface 21. That is, the area of the raised portion generated at the positive pressure generation surface 21 at the time of recording becomes larger than the area of the raised portion generated by the heater 35, therefore, the above relationship between the heater immobility line 51 and the write immobility line 52 (refer to FIG. 2 and so on) can be realized.

Figure 15:
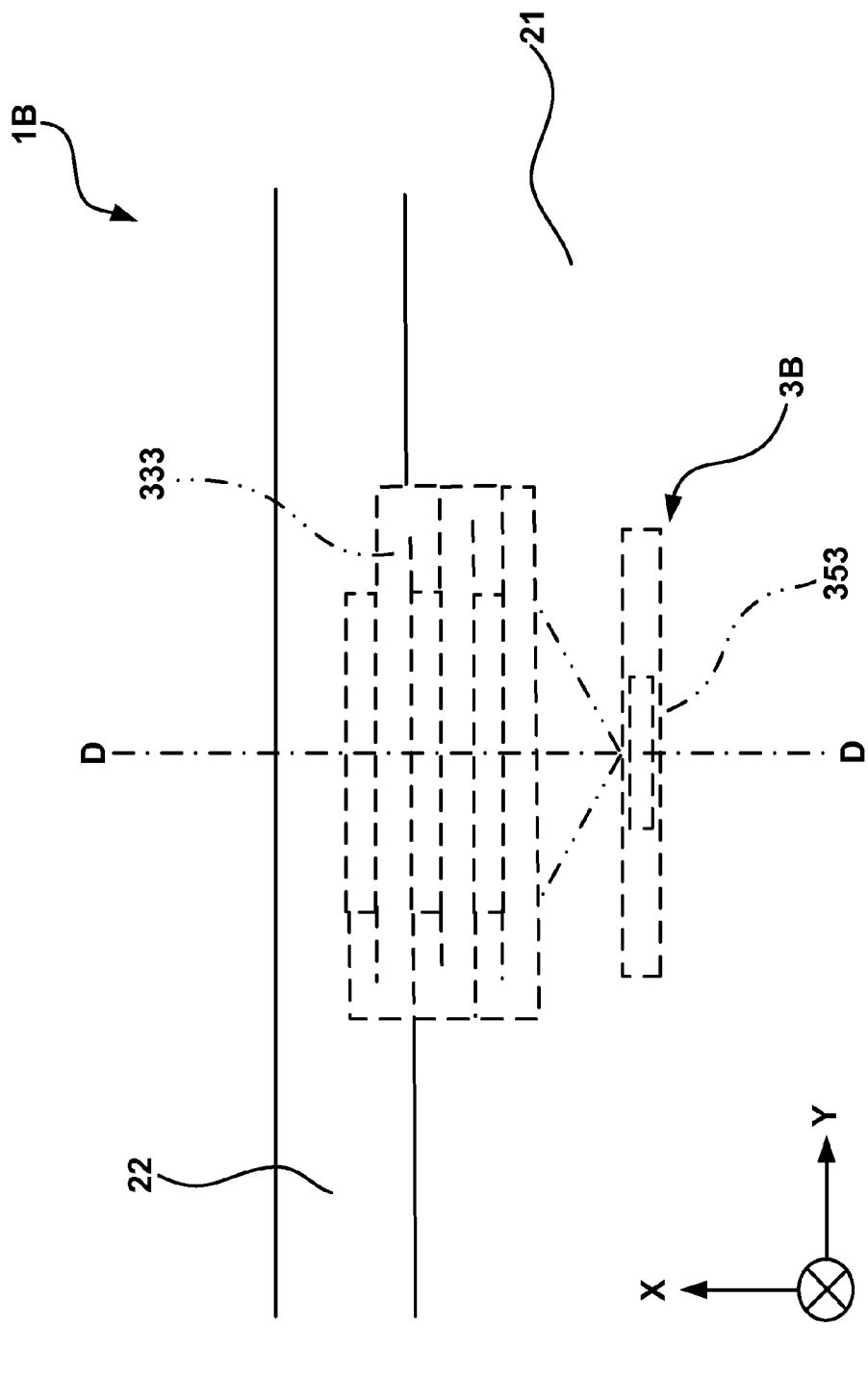
FIG. 15 is a view showing an air-bearing surface of a third embodiment of a magnetic head.
Figure 16:
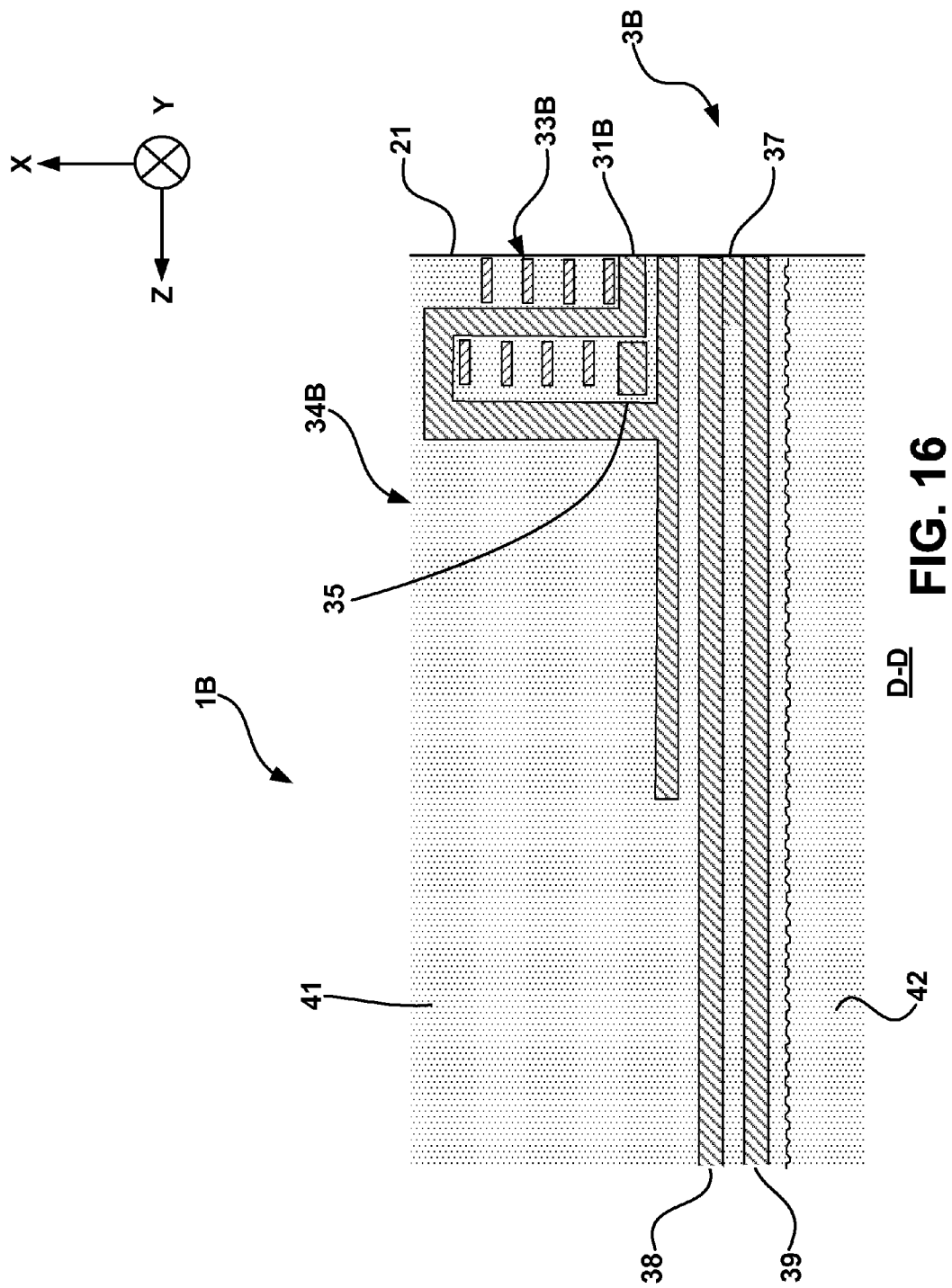
FIG. 16 is a view showing a cross-sectional structure of the third embodiment of the magnetic head.

A third embodiment of a magnetic head will be explained. FIG. 15 is a view showing an air-bearing surface of a magnetic head 1B according to a third embodiment. FIG. 16 is a cross-sectional view taken along a D-D line in FIG. 15.

In the magnetic head 1B, an element portion 3B includes a layer structure as shown in FIG. 16. In a recording element 34B included in the element portion 3B, a first magnetic pole (positive pole) 31B has a U-shape, one end of which is attached to a plate-shaped second magnetic pole 32. The other end thereof has a hook-shape, a tip of which is exposed at the positive pressure generation surface 21 in a state in which a slight gap is kept with respect to the second magnetic pole 32. A coil 33B is wound spirally, extending in the in-plane direction (X direction) of the positive pressure generation surface 21 along a part of the U-shaped first magnetic pole 31B. The heater 35 is arranged so as to be sandwiched in the U-shaped first magnetic pole 31B.

In FIG. 15, a view drawn in chain double-dashed lines shows a region in which the coil 33B is projected on the positive pressure generation surface 21 (projected coil region 333), a region in which the heater 35 is projected on the positive pressure generation surface 21 (projected heater region 353) and a region in which the first magnetic pole 31B is projected on the positive pressure generation surface 21 (first magnetic pole region 313). When the coil 33B is provided so as to extend in the in-plane direction (X direction) of the positive pressure generation surface 21, and the area of the projected coil region 333 becomes smaller than the projected heater region 353, heat expansion caused by heat generated from the coil 33B at the time of recording, or heat generated from the first magnetic pole 31B around which the coil 33B is wound will occur over a wide range of the positive pressure generation surface 21. That is, the area of the raised portion generated at the positive pressure generation surface 21 at the time of recording becomes larger than the area of the raised portion generated by the heater 35, therefore, the relationship between the heater immobility line 51 and the write immobility line 52 (refer to FIG. 2 and so on) can be realized.

Figure 17:
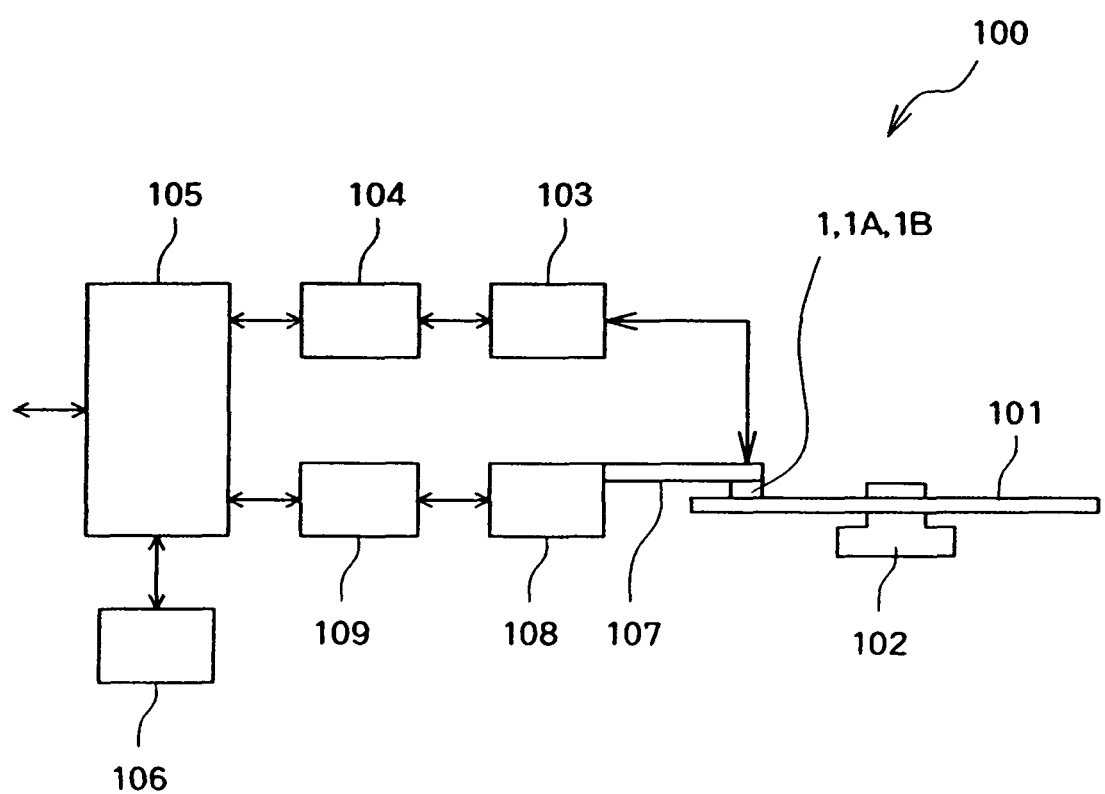
FIG. 17 is a block diagram showing a configuration of a magnetic disk drive.

An embodiment of a magnetic disk drive using the magnetic head described above will be explained. FIG. 17 is a block diagram showing a configuration of a magnetic disk drive 100. The magnetic disk drive 100 includes a magnetic disk 101, a spindle motor 102, a head amp 103 a read/write channel (R/W channel) 104, a MPU integrated circuit/a hard disk controller (MPU/HDC) 105, a memory 106, the above magnetic head 1 (or 1A, 1B), a head assembly 107, a voice coil motor 108 and a driver 109.

The magnetic disk 101 has a servo data region in which servo data is recorded and a user data region in which user data is recorded in a recording surface. In the embodiment, an example of a piece of magnetic disk in which only one side is a recording surface is shown in the figure, however, it is not limited to this, and it is also preferable that both sides are allowed to be the recording surfaces and it is also preferable to provide a plurality of magnetic disks. The magnetic disk 101 is rotated by the spindle motor 102.

The head amp 103 receives electric signals for recording from the R/W channel 104, amplifying them to be outputted to the recording element 34 (refer to FIG. 3) of the magnetic head 1. The head amp 103 receives the electric signals reproduced by the reproducing element 37 (refer to FIG. 3) of the magnetic head 1, amplifying them to be outputted to the R/W channel 104.

The R/W channel 104 receives data to be recorded from the MPU/HDC 105 at the time of recording data, generating electric signals for recording by code-modulating the data to be outputted to the head amp 103. The R/W channel 104 receives the reproduced electric signals from the head amp 103, code-modulating them to be outputted to the MPU/HDC 105.

The magnetic head 1 flies over the disk by the rotation of the magnetic disk 101. The magnetic head 1 has the above-described structure, and the flying height of the element portion is adjusted by heat generation of the heater 35 (refer to FIG. 3 and FIG. 5). Electric power is supplied to the heater 35 from a power source not shown in the figure.

The head assembly 107 holds the magnetic head 1. The voice coil motor 108 brings driving force to the head assembly 107 to move the magnetic head 1 along an almost radius direction of the magnetic disk 101. The driver 109 drives the voice coil motor 108 by receiving control signals from the MPU/HDC 105.

The MPU/HDC 105 manages control of the whole magnetic disk drive 100, performing respective controls of the magnetic head 1 such as a seek control, a positioning control, and an interface control with respect to an external host. The memory 106 includes a ROM in which programs and data necessary for the operation of the MPU/HDC 105 are stored and a RAM operating as a work memory of the MPU/HDC 105.

What is claimed is:

1. A magnetic head including a magnetic recording element and only one electrothermal body which generates heat by turning on electricity, the magnetic head comprising:
   the magnetic recording element comprising:
      a first magnetic pole; and
      a second magnetic pole, the magnetic recording element located at a first region of an air-bearing surface facing a magnetic disk, wherein heat deformation by heat generation of the magnetic recording element causes the air-bearing surface to be displaced to a side with respect to the magnetic disk;
   the only one electrothermal body located below a second region of the air-bearing surface between the first magnetic pole and the second magnetic pole, wherein the only one electrothermal body is located between the second magnetic pole and all coils, wherein said second region is included in said first region, and wherein heat deformation by heat generation of the only one electrothermal body located between the second magnetic pole and all coils causes the air-bearing surface to be displaced to the side with respect to the magnetic disk, the heat deformation of the only one electrothermal body located above the second magnetic pole and below all coils caused by providing electricity to the only one electrothermal body located between the second magnetic pole and all coils, wherein an area of the second region is smaller than an area of the first region, and wherein the electrothermal body located between the second magnetic pole and all coils comprises a resistance line, the resistance line folded alternately in opposite directions;
   a heater immobility line along which a position of a positive pressure generation surface of the magnetic head does not vary when electricity is distributed to a heater portion of the magnetic head, wherein the heater portion of the magnetic head has a rectangular outline including a resistance line folded alternately in opposite directions; and
   a write immobility line along which a position of the positive pressure generation surface does not vary at a time of recording.

2. A magnetic head comprising:
   a magnetic recording element comprising:
      a first magnetic pole;
      a second magnetic pole, the magnetic recording element located at a first region of an air-bearing surface facing a magnetic disk; and
      a coil wound along an air-bearing surface, which is a surface facing a magnetic disk, wherein a portion of the coil is covered by the first magnetic pole, and wherein the portion of the coil covered by the first magnetic pole is fixed to the first magnetic pole by a resin material;
      wherein the first magnetic pole and the second magnetic pole are folded;
   only one electrothermal body located between the second magnetic pole and all coils, which generates heat by turning on electricity, wherein the only one electrothermal body located below a second region of the air-bearing surface between the first magnetic pole and the second magnetic pole, wherein the only one electrothermal body is located between the second magnetic pole and all coils, wherein said second region is included in said first region, and wherein an area of a projected region of the coil with respect to the air-bearing surface is larger than an area of a projected region of the only one electrothermal body located between the second magnetic pole and all coils with respect to the air-bearing surface;
   a heater immobility line along which a position of a positive pressure generation surface of the magnetic head does not vary when electricity is distributed to the coil to heat a portion of the magnetic head; and
   a write immobility line along which a position of the positive pressure generation surface does not vary at a time of recording.

3. A magnetic head comprising:
   a magnetic recording element comprising:
      a U-shaped first magnetic pole;
      a second plate shaped magnetic pole, the magnetic recording element located at a first region of an air-bearing surface facing a magnetic disk, wherein one end side of the U-shaped first magnetic pole is attached to the second plate shaped magnetic pole, and wherein an opposite end side of the U-shaped first magnetic pole is tapered with respect to a positive pressure generation surface of the magnetic head; and
      a coil wound spirally along a part of the U-shaped first magnetic pole, the coil extending in an in-plane direction of an air-bearing surface, which is a surface facing a magnetic disk, wherein portions of the coil are located between the U-shaped first magnetic pole and the air-bearing surface;

only one electrothermal body, which generates heat by turning on electricity, wherein the only one electrothermal body located below a second region of the air-bearing surface between the first magnetic pole and the second magnetic pole, wherein the only one electrothermal body is located between the second magnetic pole and all coils, wherein said second region is included in said first region, and wherein the electrothermal body sandwiched between the U-shaped first magnetic pole;

wherein an area of a projected region of the coil with respect to the air-bearing surface is larger than an area of a projected region of the only one electrothermal body with respect to the air-bearing surface;

a heater immobility line along which a position of the positive pressure generation surface of the magnetic head does not vary when electricity is distributed to the coil to heat a portion of the magnetic head; and a write immobility line along which a position of the positive pressure generation surface does not vary at a time of recording.

4. A magnetic disk drive, comprising:
a magnetic head including a magnetic recording element comprising:
 a first magnetic pole;
 a second magnetic pole, the magnetic recording element located at a first region of an air-bearing surface facing a magnetic disk; and
 only one electrothermal body located below a second region of an air-bearing surface between the first magnetic pole and the second magnetic pole, the only one electrothermal body located between the second magnetic pole and all coils, wherein the second region is included in said first region, and wherein the only one electrothermal body which generates heat by turning on electricity, and wherein the electrothermal body comprises a resistance line, the resistance line folded alternately in opposite directions;
a first region in which an air-bearing surface which is a surface facing a magnetic disk is displaced to a side of the magnetic disk due to heat deformation by heat generation of the magnetic recording element at a time of recording;
wherein the second region of the air-bearing surface is displaced to the side of the magnetic disk due to heat deformation by heat generation of the only one electrothermal body at a time of turning on electricity, wherein an area of the second region is smaller than an area of the first region;

a heater immobility line along which a position of a positive pressure generation surface of the magnetic head does not vary when electricity is distributed to a heater portion of the magnetic head, wherein the heater portion of the magnetic head has a rectangular outline including a resistance line folded alternately in opposite directions; and a write immobility line along which a position of the positive pressure generation surface does not vary at a time of recording.

5. A magnetic disk drive comprising:
a magnetic head comprising:
a magnetic recording element comprising:
 a first magnetic pole;
 a second magnetic pole, the magnetic recording element located at a first region of an air-bearing surface facing a magnetic disk; and
 a coil wound along an air-bearing surface, which is a surface facing a magnetic disk, wherein a portion of the coil is covered by the first magnetic pole, and wherein the portion of the coil covered by the first magnetic pole is fixed to the first magnetic pole by a resin material;
 wherein the first magnetic pole and the second magnetic pole are folded;
 only one electrothermal body located between the second magnetic pole and the coil, which generates heat by turning on electricity, wherein the only one electrothermal body located below a second region of the air-bearing surface between the first magnetic pole and the second magnetic pole, wherein the only one electrothermal body is located between the second magnetic pole and all coils, wherein said second region is included in said first region,
wherein an area of a projected region of the coil with respect to the air-bearing surface is larger than an area of a projected region of the only one electrothermal body located between the second magnetic pole and the coil with respect to the air-bearing surface;
a heater immobility line along which a position of a positive pressure generation surface of the magnetic head does not vary when electricity is distributed to the coil to heat a portion of the magnetic head; and
a write immobility line along which a position of the positive pressure generation surface does not vary at a time of recording.

* * * * *